United States Patent [19]

Austad

[11] Patent Number: 4,681,031
[45] Date of Patent: Jul. 21, 1987

[54] VEGETABLE AND FRUIT JUICE EXTRACTING MACHINE

[76] Inventor: John Austad, 3330 State St., San Diego, Calif. 92103

[21] Appl. No.: 858,371

[22] Filed: May 1, 1986

[51] Int. Cl.$^4$ .............................................. A23N 1/00
[52] U.S. Cl. ......................................... 99/511; 99/513
[58] Field of Search .................. 366/197, 200; 99/348, 99/509–513, 456, 495, 503

[56] References Cited

U.S. PATENT DOCUMENTS 2,527,695 10/1950 Bennett .................................. 99/511
3,086,570 4/1963 Austad .................................... 99/511

Primary Examiner—Timothy F. Simone
Attorney, Agent, or Firm—Brown, Martin, Haller & Meador

[57] ABSTRACT

Apparatus for extracting juice from vegetable or fruit stock material comprising a housing having a base with and an upper portion that has a cylindrical wall with an interior step along the top edge. An elongated extension projects from one position along the upper housing to form the base channel for a pulp discharge chute. An apertured cover having an interlocking wall positioned about its periphery and configured to mate with the upper housing wall also has a step formed therein which is complementary to the step in the upper housing wall. A motor is secured within the base with its shaft extending into the upper housing where it is coupled to a screen basket and a lower cutter blade assembly. An upper cutter bar assembly is positioned parallel to the lower blade assembly and acts to comminute vegetables and fruit. A juice collection means positioned within the upper housing but outside of the screen basket collects the juice from the pulverized vegetables or fruit and transfers it out of the extraction apparatus. The juice collector employs a flared, angled rim to interlock between the cover and upper housing steps to form an improved seal. The bottom of the collector can also be shaped to improve the transfer of juice and decrease clogging.

9 Claims, 7 Drawing Figures

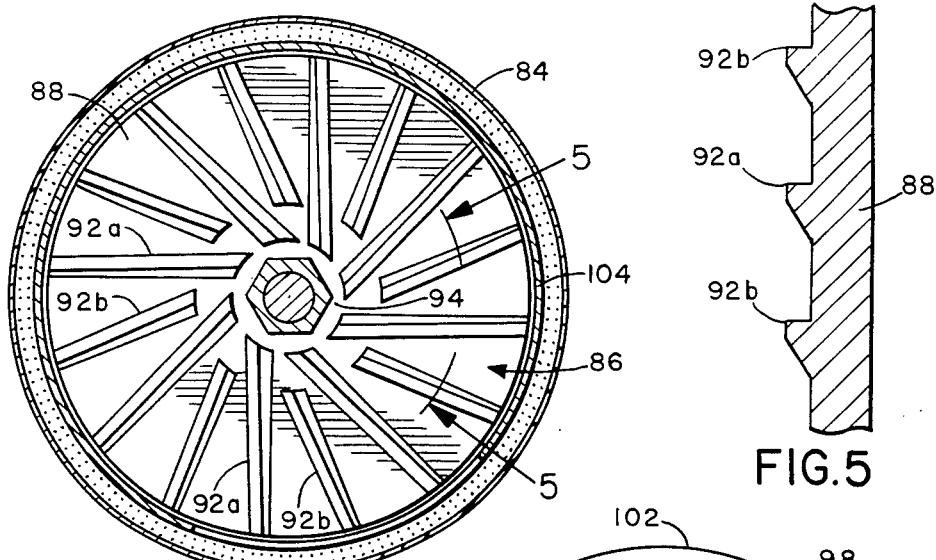
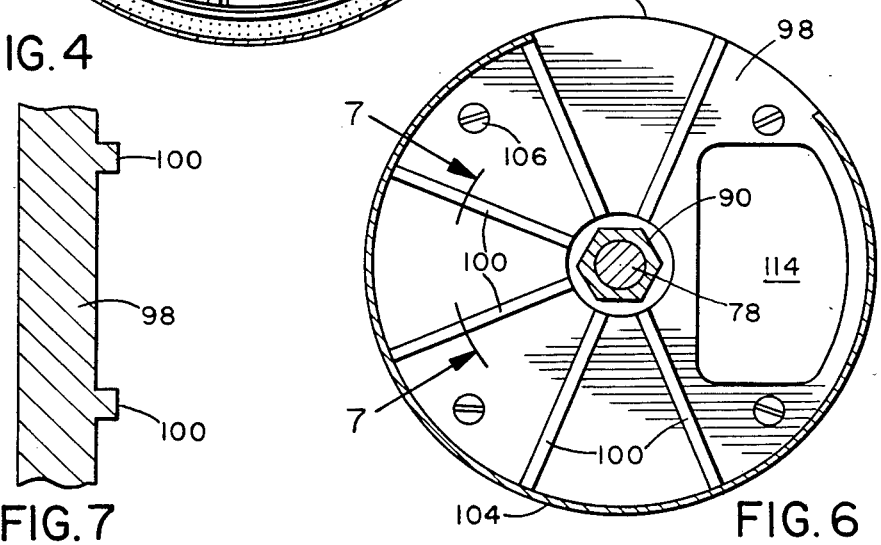

VEGETABLE AND FRUIT JUICE EXTRACTING MACHINE

FIELD OF THE INVENTION

This invention relates to vegetable and fruit juice extracting apparatus and more particularly to an electrically driven apparatus for comminuting raw vegetables or fruit into a pulp, straining the juice from the comminuted pulp and depositing the juice and pulp in separate containers.

BACKGROUND

In the art of fruit and vegetable juice extraction many problems and design characteristics must be accounted for in developing apparatus which is efficient in operation as well as exhibiting economy of manufacture and operation. These problems include unequal pulp accumulation for centrifugal juice separation processes which tend to unbalance the juice extractor leading to intense vibration or inoperability. In addition, extremely fine or fibrous materials tend to resist pulverization.

These and additional problems encountered in this art related to pulp removal, efficient separation of pulp and juice at high rates, etc. were addressed in U.S. Pat. No. 3,086,570 issued to A. Austad in 1963. While the invention disclosed in U.S. Pat. No. 3,086,570 did overcome many of the attendant disadvantages existent in the art at the time, and greatly advanced the art of juice extraction, it has not solved all potential problems apparent in the art.

Those skilled in the art of juice extracting machinery are always desirous of a higher efficiency of juice production to raw material production. This is especially true for the commercial setting where the percentage of output per given raw input product has an immediate impact on profitability. It would advance the art to provide a more efficient extraction apparatus. In addition, especially during periods of constant or high volume usage, the juice containing portions of an extraction apparatus such as disclosed in U.S. Pat. No. 3,086,570 have a tendency to leak juice down toward the motor compartment which presents an electrical hazard and cleaning problem. What is needed is an improved method of sealing juice extractor components. Another problem that often occurs is the fact that extraction devices tend to have straight vertical sides and mounting schemes whereby the machines tend to be top heavy and relatively unstable. An additional problem can be seen in that the means for fastening the enclosure together as disclosed in U.S. Pat. No. 3,086,570 is a somewhat awkward bolt or knob assembly requiring an operator to be able to twist and turn a knob or a bolt head to obtain a reasonably satisfactory closure. While this is satisfactory for occasional disassembly of the machine, it is a problem for high volume commercial usage where the machine may require cleaning or other disassembly on a more frequent basis. An operator is required to have either high hand strength, or a high friction non-slippery contact, which is not always true. It would be an improvement in the art to provide a securing means for an enclosure similar to that of U.S. Pat. No. 3,086,570 which allows for a non-rotary type closure that does not take up quite the bulk and space as shown therein.

SUMMARY

Therefore, it is an object of the present invention to provide a vegetable and fruit juice extracting apparatus which obtains a higher rate of juice extraction per unit volume of raw material.

It is also an object of the present invention to provide a fruit and juice extracting apparatus which manipulates the flow of pulp produced from raw input material in an improved manner resulting in improved output flow of pulp and decreased internal build up.

It is a further object of the present invention to provide a vegetable and fruit extracting apparatus which has a more stable operational configuration and more efficient means for sealing the enclosure. A further feature of the invention resides in its ability to produce extracted juice at a higher volume flow rate and yet exhibit reduced propensity to leakage.

These objects and advantages are accomplished in a juice extracting apparatus having a housing comprising in one aspect a frustra-conical shaped base attached to a cylindrical upper housing which has a pulp discharge duct extending therefrom. The housing has an open top onto which is inserted an apertured top cover. Both the upper housing and the cover have mating steps. An electrically driven motor unit is mounted within the base and has a cord that extends out through the wall of the housing and a switch mounted on a side of the housing for activating the motor. The motor shaft extends from the base into the upper housing where it turns a conical screen basket. A plurality of cutter blades are positioned adjacent to the bottom of the screen basket and also secured to the shaft of the motor. Located exterior of the screen basket, but on the interior of the upper housing, is a container for holding the juice produced during the operation of the extraction apparatus. The container is formed so that it clears the bottom of the housing and angles up toward the center. In addition, this container has a flared, angled, top rim which mates with a top edge of the housing.

To complete the assembly of the juice extraction apparatus the apertured top is secured to the cylindrical portion using cantilevered toggles. Extending into the upper housing from the apertured top is a cylindrical plug having a bottom surface parallel to and spaced apart from the cutter blades. Secured to the bottom surface of this plug is a mating cutter plate. Around the periphery of the mating plate is a directing wall which provides direction to the pulp.

BRIEF DESCRIPTION OF THE DRAWINGS

The novel features of the present invention may be better understood from the accompanying description when taken in conjunction with the accompanying drawings in which like characters refer to like parts and in which:

FIG. 4 is a sectional view taken on line 4—4 of FIG. 3;

FIG. 5 is an enlarged sectional view taken on line 5—5 of FIG. 4;

FIG. 6 is a sectional view taken on line 6—6 of FIG. 3; and

FIG. 7 is an enlarged sectional view taken on line 7—7 of FIG. 6.

DETAILED DESCRIPTION OF A PREFERRED EMBODIMENT

The present invention comprises an apparatus for extracting juice from raw vegetables or fruit. The juice extraction apparatus utilizes an electric motor to propel a series of cutter blades which macerate stock material inserted into the apparatus, producing a pulp from which juice is then extracted. The pulp is then discharged into a transfer or disposal container on the one hand and the juice into a separate storage or transfer container.

Figure 1:
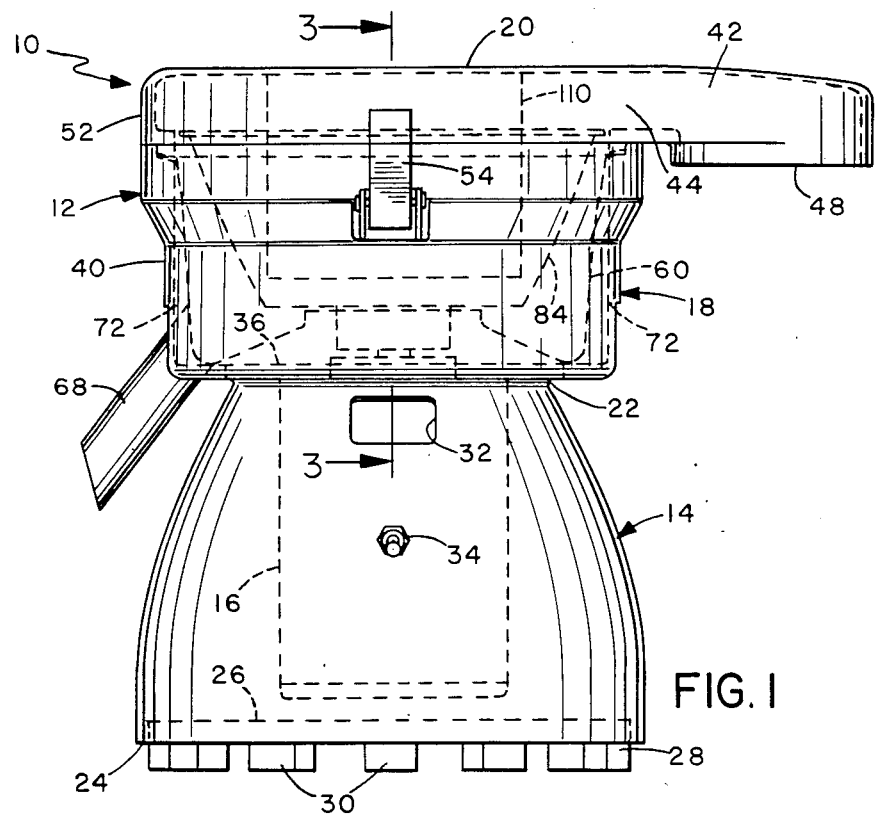
FIG. 1 is a side elevation view of a juice extractor according to the present invention.

A preferred embodiment of a juice extractor 10 constructed according to the principles of the present invention is illustrated in a side elevational view in FIG. 1. As shown in FIG. 1, the juice extractor 10 comprises a generally cylindrical housing 12 which has a lower or base portion 14 for enclosing an electric motor 16 and an upper portion 18 for enclosing the processing elements, described below, used for juice extraction. The upper housing 18 is open on top for easy access and assembly of the processing elements, and uses a cover 20 for completing the enclosure.

The base 14 and the upper housing 18 are joined together at an interface 22 to form a unitary structure for the housing 12. This is preferably accomplished by, but is not limited to, metal casting techniques known in the art for forming steel or aluminum into predesigned shapes.

The single unit construction of the housing 12 simplifies assembly and maintenance by providing fewer parts. It also means fewer bolts to be loosened by the vibration of the operating extractor 10 thus eliminating periodic adjustment or maintenance.

The base 14 of the housing 12 has a generally frustum or frustra-conical shape with a larger diameter at a bottom edge or rim 24 than at the top or interface 22 position of the base 12. This means that the base 12 flares outward to provide a larger "foot print" for the extractor 10 while maintaining a smaller volume around the top of the motor 16 to maintain heat dissipation. This improves the stability of the housing 12 making it less prone to "tip over" or less "top heavy" as is otherwise seen when the base 12 has a diameter uniformly smaller than upper housing 18.

The rim 24 is cast, or otherwise formed, with sufficient material so that a channel 26 can be formed therein either as part of the casting process or by methods such as milling. The channel 26 extends around the perimeter of the base 14 for accepting support leg material 28. The preferred material 28 is a castellated dense rubber strip secured within the channel 26 by methods known in the art, such as industrial cement, where it forms a series of legs 30 evenly spaced about the bottom edge 24 of the base 14.

A castellated leg configuration provides a soft and secure base having improved stability over simple 3 or 4 leg stands, especially in commercial and high volume applications where the juice extractor 10 is subjected to a variety of sideways forces many times during use and may be placed on a variety of surfaces. The leg material 28 can alternately comprise flexible materials other than rubber provided they support the weight of the juice extractor 10 and absorb sound and vibrations as well as conform to minor surface variations.

The base 14 is provided with at least two air vents 32 preferably positioned near the interface 22 so that heat rising from the motor 16 is quickly dissipated out of the housing 12. In the preferred embodiment, the bottom surface of the housing 12 or base 14 is open to allow for increased air flow in cooling the motor 16, although this is not required.

A switch 34 is secured to the wall of the base 12 and connected to an electrical source (not shown) using an electrical cord and feed through (not shown) as is known in the electrical arts.

A plate 36 extends across and closes the top of the base 14 where it meets the upper housing 18 at interface 22. The plate 36 separates the structure of the housing 12 into the base 14 and the upper housing 18 and provides a support platform from which the motor 16 is suspended, by means such as bolts 38. The plate 36 can be formed as part of the housing 12 during casting or welded in as a separate piece depending upon the desired construction method used for housing 12.

The use of a unitary structure for the housing 12 and a single plate 36 thickness separation between the base 14 and the upper housing 18 is very advantageous for motor operation.

The juice extractor disclosed in the previously discussed U.S. Pat. No. 3,086,570 used two metal plates and deformations for the bolt heads between the upper housing and the base. By providing a much smaller separation between the processing elements and the motor, the motor is closer to the elements it must power and the length of motor shaft required is much shorter, on the order of 50% shorter. Beyond a savings in length, this allows lateral forces from the processing to be handled in a superior manner by the motor bearings which greatly reduces vibration, especially if unbalanced pulp distribution is encountered.

The upper housing 18 is formed by a cylindrical side wall 40 extending vertically from the plate 36. The plate 36 closes one end of the generally cylindrical upper housing 18 with the other end being open. The open end then comprises the top opening for the housing 12 which is closed by a cover 20.

The cover for the upper housing 18 has an extension 42 projecting outward from one radial position which comprises a shallow channel having shallow side walls 44. The extension 42 has a hole 48 adjacent to its outer end for receiving and holding a discharge chute or tube, not shown. The discharge tube can be secured in place using one of several known techniques such as threaded surfaces, bayonet slot type connections or clamps. The length of the extension 42 depends both on the size of the discharge tube desired for the material commonly processed in the juice extractor 10, and the required separation for any discharge container, not shown, including its radial dimensions. The clearance must account for the dimensions of the base portion 14 as well as access space to grasp or move a discharge container.

Figure 2:
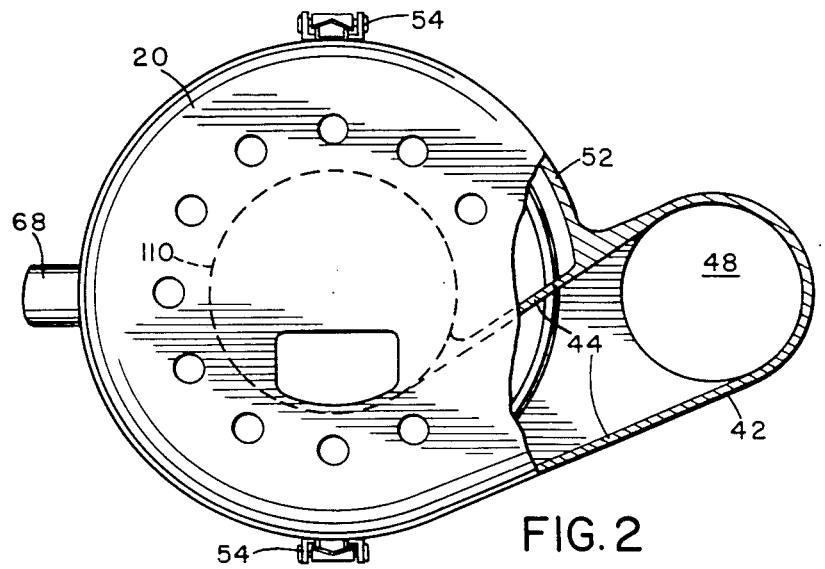
FIG. 2 is a top plan view of the juice extractor of FIG. 1, with a portion of the cover cut away.

The top of the cover 20 is further illustrated in FIG. 2 as an apertured plate of surface having a shape that coincides with the outline of the upper housing 18 as well as the side extension 42. The cover 20 has a raised edge or wall 52, shown in FIG. 3, running about its periphery for mating to the walls 40 and 44. Therefore, the cover 20 serves to enclose the processing volume surrounded by the wall 40 and floor 36 (plate) and to form a discharge chute for material from the upper housing 18. The holes in the cover 20 prevent the build up of internal turbulence and drag forces which degrade the operation of the extractor 10.

The cover 20 is secured in place on top of the upper housing 18 using a fastening means 54. The preferred fastening means comprises two latches in the form of stainless steel toggle clamps. This type of fastener provides a strong and sure connection of the mating surfaces and yet is easy to engage and disengage without rotary motion which can be a problem in a commercial setting with wet hands, etc.

Figure 3:
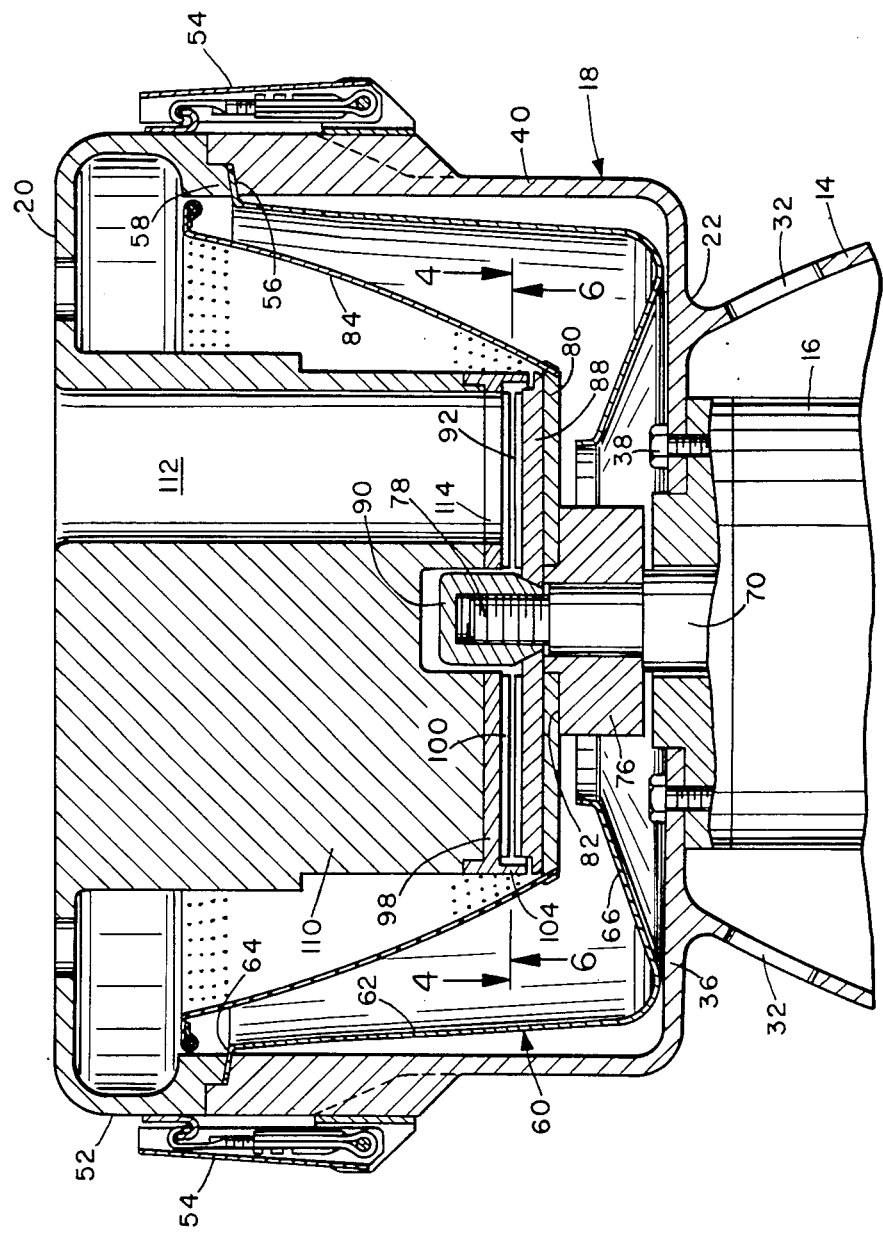
FIG. 3 is an enlarged sectional view taken on line 3—3 of FIG. 1.

Turning now to the details of the upper housing 18 as illustrated in FIG. 3, the walls 40 (and 44) of the upper housing 18 have a step 56 formed in the top edge. The step 56 is preferably formed by precision machining and has a lateral width of approximately one-half the total wall (40) thickness. The step is formed so that the inner edges of the walls is lower than the outer edges. In addition, the bottom of the step 56 slants downward at an angle toward the floor 36. The precise angle at which the step 56 slants is not critical but is typically on the order of 15 degrees and is related to the juice collection bowl described below.

The raised edge 52 of the cover 20 has a matching step 58 machined therein so that the cover 20 and the walls 40 and 44 of the upper portion 18 interlock when the cover 20 is in place. This forms a more secure and predetermined positioning of the cover 20 on the housing 12 and seals the upper housing 18 against leakage of fluids during juice extraction. The steps 56 and 58 also function to secure a juice collection bowl 60 in place within the wall 40 of the upper housing 18.

The bowl 60 is preferably formed out of stainless steel material and has a sloping side wall 62 which terminates in a rim 64. The rim 64 is formed by flaring a portion of the wall 62 outward at substantially the same angle as that of the steps 56 and 58. The rim 64 is positioned between the cover 20 and the wall 40 so that the steps 56 and 58 sandwich against the rim 64. This has the advantage that it provides a superior liquid tight seal for the top of the bowl 60 and does not allow liquids to spill over or around the top edge of the wall 62 to get down under the bowl 60 as could happen in previous juice extractors.

The top edge of the bowl 60 has been previously rolled or beaded to form a rim of reasonable rigidity which is used to hang the bowl from a ledge or machined edge within the upper housing 18. However, it has been discovered that a better seal and improved enclosure are obtained in the present invention. Furthermore, this technique provides a very stable hold on the bowl 60 as compared to previous techniques.

The wall 62 of the bowl 60 extends downward from the steps 56 and 58 toward the floor 36 where it curves inward toward the center and forms an annular bottom section 66. At its inner most extension the wall 62 can be rolled or otherwise finished as known in the art to provide a generally rigid and smooth edge for commercial usage. The generally annular shape for the bowl 60 allows for the passage of a motor shaft 70 from the motor 16 through the center.

In previous designs, however, it was thought that a simple curved bottom having a circular or almost flat shape with an interior lip was sufficient to accomplish the basic function of a juice collection bowl. It has been discovered that by forming the bottom so that it has a sharp upward slant from the floor 36 as it extends toward the interior, or motor shaft 70, a better flow of juice is provided. In addition, and more importantly, this shape provides for much less clogging in the case of some pulp build up in the bowl 60 which occurs for certain raw materials and screen sizes. The precise angle can vary with some applications but should be on the order of at least 30 degrees. Another feature of the bowl 60 is that it is intended to have a depth somewhat less than the height of the wall 36 of the upper housing 18.

Juice extracted into the bowl 60 must be transferred out of the juice extractor 10 for use. Therefore, at least one spout 68 is provided in the bowl 60 which extends through passages 72 in the wall 40. Preferably there are two passages 72 located approximately 180 degrees arc length apart along the wall 40 so that the bowl 60 can be inserted in the extractor 10 to dispense juice in two different directions without moving the entire extractor 10. The spout 68 typically comprises a stainless steel tube welded onto the bowl 60 having a fairly sharp downward angle for rapid juice flow and extraction. The tube is attached to the bowl so that the bottom of the bowl is above the edge of the tube to fully drain all the juice.

In FIG. 3 the motor shaft 70 is seen extending through the floor 36 and the central opening in the bottom of the bowl 60 through a hub 76 and terminating in a threaded end 78.

The hub 76 is used to position a screen support plate 80 above and substantially parallel to the floor 36 and above the inner edge of the bowl 60. This plate is preferably formed from stainless steel and is typically, but not necessarily, on the order of 0.187 inches thick. This provides a plate having adequate structural integrity for the loads produced during juice extraction. In the preferred embodiment, the plate 80 rests on the hub block 76 in a recess 82 machined in the upper edge of the hub 76.

A screen wall 84 is fastened to the screen plate 80 about its circumference. The preferable method of securing the screen 84 is by electrical resistance welding. It has been found that this method provides a very strong bond of the surfaces and provides the proper strength required while decreasing the complexity of this joint. It also results in a very smooth, uniform connection.

The screen material employed for the screen wall 84 is preferably made from stainless steel to withstand the high forces associated with the extraction process and has openings or a mesh size on the order of 0.025 inches in diameter. The exact mesh size will depend on the variety of raw materials processed and the dimensions of the pulp produced which is discussed below. The screen 84 has a mesh dimension adequate to prevent a substantial portion of the pulp from traversing the screen while allowing juice to flow through. It is apparent to one skilled in the art of juice extraction what predetermined dimensions are desired.

The basket formed by the screen wall 84 and plate 80 has a slanting or conical side which bows inward slightly at the top as it angles toward the cover 20. The slight inward bow of the screen wall 84 as opposed to a straight conic side allows improved flow control over the pulp produced in the extractor 10. This controls the rate at which pulp will move across the screen and provide more time for juice to be extracted.

The top edge of the screen wall 84 is spun to a horizontal flange, typically 0.313 inches wide and then rolled back around a stainless steel rod to form a substantially rigid, smooth edged structure.

Positioned adjacent to and preferably on top of the screen plate 80 is a cutter blade assembly 86. A threaded nut 90 threads onto the threaded motor shaft 70 and secures the blade assembly 86 in place. The nut 90 is tapered at an angle, on the order of 60 degrees, which matches a tapered hole on the plate 86. This secures the plate 86 laterally and provides pressure on the screen plate 80 to the spacer 76. This secures the plates 86, 80 in place without special pins or keys to prevent slippage and assures a positive drive.

The blade assembly comprises a series of cutter blades that are used to comminute or macerate the raw stock materials into a pulp. It has been found that a solid plate 88 having cutting ridges 92 formed or machined thereon works better than a plate having individual blades secured by means such as screws. The assembly is simpler and the cleaning and maintenance is greatly simplified. Another advantage is that a larger number of blades is obtained which greatly increases the processing efficiency. The use of the specific blade arrangement discussed below with the increased blade count leads to improved juice extraction on the order of 25–30%. In addition, improved distribution of pulp about the screen wall 84 is obtained.

FIG. 4 illustrates a sectional view of the extractor 10 as shown in FIG. 3, which provides a top view of a blade assembly constructed according to the present invention.

As shown in FIG. 4, the plate 88 has 16 cutter blades or ridges 92 extending radially out from the center. The preferred embodiment employs 16 blades as a very efficient juice extractor leaving less pulp. The actual number of cutter blades 92 employed will vary with the specific application desired. Fewer blades can be used where more leftover pulp is permissable as in some commercial applications. Actually the blades 92 comprise two sets of ridges 92a and 92b. The first set of blades 92a are 8 ridges machined on the plate 88 starting adjacent to the central hole 94 used to secure the plate 88 in place. The ridges 92a extend tangential to this hole outward to the edge 96. The ridges are equally spaced about the face of the plate 88 in order to provide a balanced center of mass and reduce vibration.

The second set of blades 92b are 8 ridges positioned in between the first set but starting at a radial position farther away from the center hole 94. This configuration is used to achieve a high density positioning of 16 blades having widths on the order of 0.250 which precludes all blades fitting to the center without creating an undesirable, essentially flat region near the center.

The shape or contour of the ridges or blades 92 is illustrated in FIG. 5 where it can be seen that the leading or cutting edge has a perpendicular projection from the face of the plate 88 while the trailing edge is sloped.

Positioned above the cutter blade assembly 88 is a cutter plate 98 which interacts with the blades 92 to macerate the raw vegetable or fruit stock fed into the extractor 10. The cutter plate 98 has a series of six radially extending ridges 100 which serve to confine the flow of material over the blades 92 leading to the comminution. FIG. 7 is an enlarged cross sectional view of the ridges 100 showing the vertical faces thereon. The blades 92 and ridges 100 are typically spaced apart by twice the chosen diameter of the apertures in the screen wall 84.

Surrounding the periphery 102 of the cutter plate 98 is a wall 104 which serves to guide and control the flow of pulp to the screen wall 84. This wall extends for an arc length of approximately 270 degrees around the plate 98 so that the pulp must travel over the blades for this length before it can be expelled onto the screen 84. It has been discovered that an arc length of 270 degrees greatly improves the pulverization of the raw stock material and provides improved juice output, especially for materials like parsley and cabbage.

The cutter plate 98 is positioned relative to the cutter assembly 88 such that the separation between the blades 92 and the ridges 100 is on the order of twice the diameter of the holes in the mesh of the screen wall 84. This assures the blade tips are positioned about twice the distance of the screen hole size to assure adequate pulp size.

The cutter plate 98 is secured by means such as screws 106 to the bottom of a plug 110 which projects downward into the upper housing 18 from the cover 20. Plug 110 is centrally located on the cover 20 and serves to position the plate 98 within the upper housing 18 as well as fill unnecessary volume within the screen wall 84 which is not occupied by any pulp to prevent turbulence and excessive drag.

The sides of the plug 110 are approximately perpendicular to the floor 36 and the top 20 and terminate adjacent to the plate 88. A tube or input chute 112 extends from an opening 114 in the cutter plate 98 up to the top of the cover 20. This chute is sealed to the cover 20 so that no juice or material can escape from within the upper housing 18 through the sides of the chute 112. As known in the art, this chute can be shaped to accept a pusher, not shown, for pressing raw stock into the juice extractor 10. In this case the pusher would have a ridge or other retention means which would engage the top of the cover 20 so that it could not accidentally engage the blades 92 and damage them.

During operation of the juice extractor 10 raw material is fed into the volume between the blades 92 and the ridges 100 through the chute 112 where it is pulverized to form pulp. This pulp is then exposed to a centrifugal force that pushes it out across the blades and through the opening in the wall 104 to the screen wall 84. Here the pulp works its way up the wall 84 while juice is extracted through the screen and into the juice collection bowl 60. The juice is rapidly collected and drained through the spout 68 while the pulp collects and exits through the channel in extension 42 and out through a discharge chute.

What has been described is a new apparatus for extracting juice from raw vegetables or fruits which exhibits improved efficiency.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

I claim:

1. Apparatus for extracting juice from vegetable or fruit stock material comprising:
   an extractor housing comprising:
   a base housing;

an upper housing having a cylindrical outer wall having an open top end and a bottom end closed by a circular floor having a central aperture therein, said upper housing being joined to the base adjacent the circular floor, with the top end of the outer wall having a step formed therein along an inner edge with a sloping bottom which makes a predetermined angle toward the circular floor;

pulp discharge means extending outward from the cylindrical outer wall of the upper housing for forming a pulp discharge chute; and apertured cover means having an interlocking wall positioned about its periphery configured to coincide with the upper housing outer wall, and having a step formed therein which is complementary to the step in the cylindrical outer wall;

a motor secured within the base housing having a rotatable shaft with a threaded end extending through the central aperture of the circular floor, the motor having a casing which extends through the central aperture a predetermined distance above the circular floor to prevent liquid penetration into the motor;

juice collection means positioned within the upper housing having an annular bottom so that the motor shaft extends therethrough and a collector side wall extending parallel to the cylindrical outer wall, said collection means side wall terminating in a rim which flares out from the collector side wall at a predetermined angle conincident with the predetermined angle of the outer wall step bottom, said juice collection means being positioned within the housing so that the flared rim rests in the outer wall step and is contacted by the cover interlocking wall so as to provide a substantially liquid tight seal;

spacer means positioned about said motor shaft between said motor housing and the threaded end, said spacer means having a surface extending above the annular bottom of the juice collection means;

screen basket means suspended interior of the collection means resting on the spacer means and having an aperture through which the threaded end of the motor shaft extends, operatively coupled to the motor shaft for spinning, having a conic shaped porous wall extending upward from a substantially flat support plate, said porous wall having openings of predetermined size for allowing the passage of juice therethrough but not pulp; a lower blade assembly positioned adjacent to the support plate inside the screen basket having a central aperture through which the threaded motor shaft extends and coupled to the motor shaft, comprising a circular cutter plate machined to have at least 8 vertically extending ridges from one side which form cutter blades, with said cutter blades extending outward along the surface of said plate from a center position;

a threaded nut disposed on the threaded end of said motor shaft having a beveled lower edge for engaging a beveled inner edge on the central aperture of said lower blade assembly when tightened so as to clamp said blade assembly and screen basket in place on said motor shaft;

a generally cylindrical plug extending down from the cover having a bottom surface substantially parallel to and spaced apart from the lower blade assembly, said plug having means for transferring the vegetables or fruit to a space between the plug and the lower blade assembly; and an upper cutter bar assembly secured to the bottom of the plug and spaced apart from the lower blade assembly by a distance predetermined by the vegetable or fruit to be processed and the preselected size of the openings in the porous wall, said upper cutter bar assembly being a circular plate having a plurality of raised ridges thereon.

2. The juice extraction apparatus of claim 1 wherein said base housing is frustum shaped.

3. The juice extraction apparatus of claim 2 further comprising a channel formed about a bottom edge of the base housing for holding a castellated footing structure.

4. The juice extraction apparatus of claim 1 wherein said screen basket means comprises a stainless steel support plate having a stainless steel screen electrically resistance welded thereto and extending upward at an angle, having a slight bow in the cross section thereof and terminating in an edge which is rolled over a support wire running around the perimeter of said screen basket means.

5. The juice extraction apparatus of claim 1 wherein said lower blade assembly comprises a circular stainless steel machined to have about 16 vertically extending ridges from one side which form the cutter blades.

6. The juice extraction apparatus of claim 1 wherein said upper cutter assembly further comprises a wall extended about the periphery of the order of 270 degrees of arc length, said wall having a height greater than the separation of the upper cutter blades and the lower blade assembly.

7. The juice extraction apparatus of claim 1 wherein said upper cutter bar assembly is made from a single piece of stainless steel.

8. The juice extraction apparatus of claim 1 wherein said lower blade assembly comprises a single piece of stainless steel.

9. The juice extraction apparatus of claim 1 wherein said motor shaft and threaded nut both are threaded so that the nut tightens on said motor shaft by turning in the opposite direction from rotation of the rotatable motor shaft.

* * * * *